Figure 1:
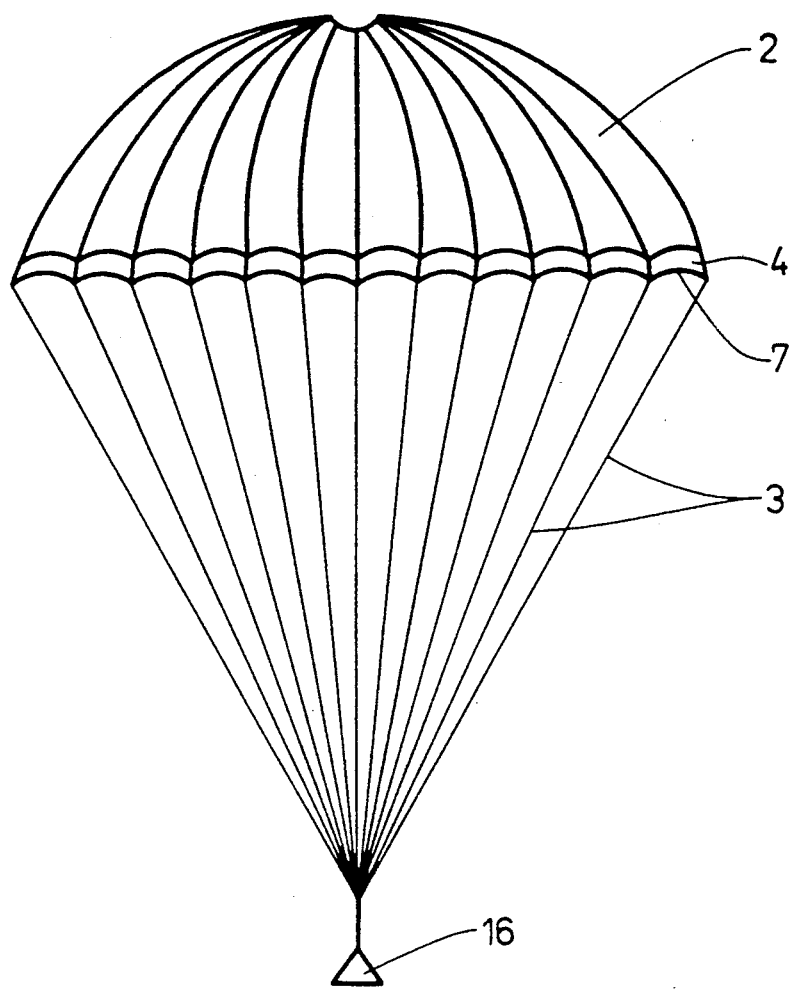

United States Patent [19]
Krebber

[11] Patent Number: 5,028,018
[45] Date of Patent: Jul. 2, 1991

[54] DEVICE FOR ACCELERATING THE OPENING AND/OR EXTENSION OF AVIATION DEVICES, SUCH AS CANOPY PARACHUTES, SQUARE OR SLIDING PARACHUTES, GLIDERS (HANG-GLIDERS) AND OTHERS

[76] Inventor: Burghardt Krebber, Landsberg, Fed. Rep. of Germany

[21] Appl. No.: 138,493

[22] Filed: Dec. 7, 1987

[30] Foreign Application Priority Data

Apr. 7, 1986 [DE] Fed. Rep. of Germany ....... 3611581
Mar. 13, 1987 [DE] Fed. Rep. of Germany ....... 3708160

[51] Int. Cl.⁵ ...................... B64D 17/72; B64D 17/36
[52] U.S. Cl. .................................... 244/146; 244/152
[58] Field of Search ............... 244/142, 145, 146, 148, 244/149, 152

[56] References Cited

U.S. PATENT DOCUMENTS

| | | | |
|---|---|---|---|
| 1,678,537 | 7/1928 | Schonbrun | 244/146 |
| 1,861,784 | 6/1932 | Brown et al. | 244/146 |
| 2,759,694 | 8/1956 | Lemoigne | 244/146 |
| 2,929,589 | 3/1960 | Carter et al. | 244/152 |
| 3,756,547 | 9/1973 | Snyder et al. | 244/152 |
| 3,806,070 | 4/1974 | Centofanti | 244/146 |
| 4,406,433 | 9/1983 | Radkey | 244/145 |
| 4,708,078 | 11/1987 | Legaignoux | 244/145 |
| 4,768,739 | 9/1988 | Schnee | 244/153 R |

Primary Examiner—Galen Barefoot
Attorney, Agent, or Firm—Horst M. Kasper

[57] ABSTRACT

Device for accelerating the opening and/or the extension of aviation devices, such as canopy, square or gliding parachutes, among others, has an air space (4) at the base (7) and along the circumference of the canopy (2). The air space (4) has for example the form of a hose or of an air-impervious hem which is under high air pressure in operative conditions, so that when the wrapper is opened this air space stretches out in a very short time and the aviation device opens after a fall of only 20–30 m.

18 Claims, 4 Drawing Sheets

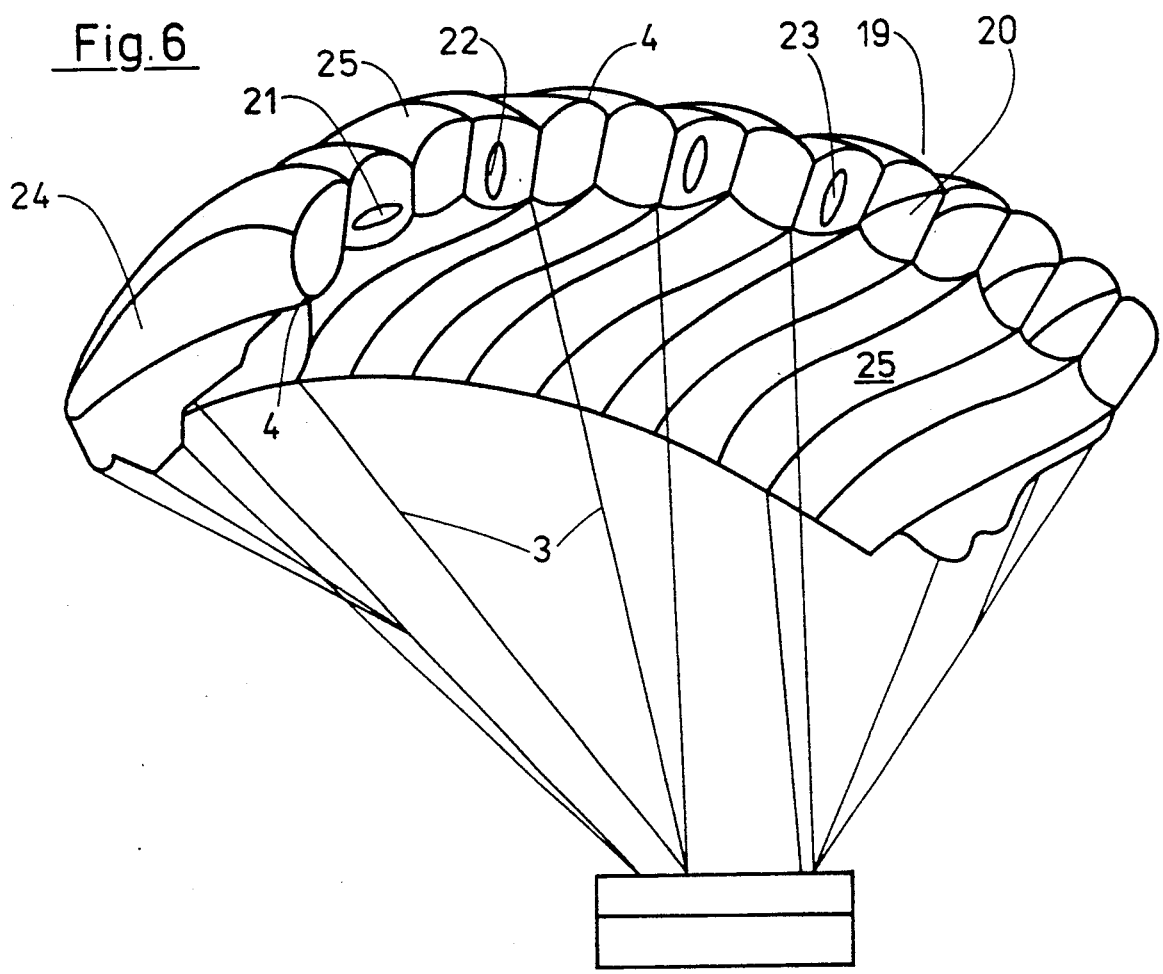
Fig. 6
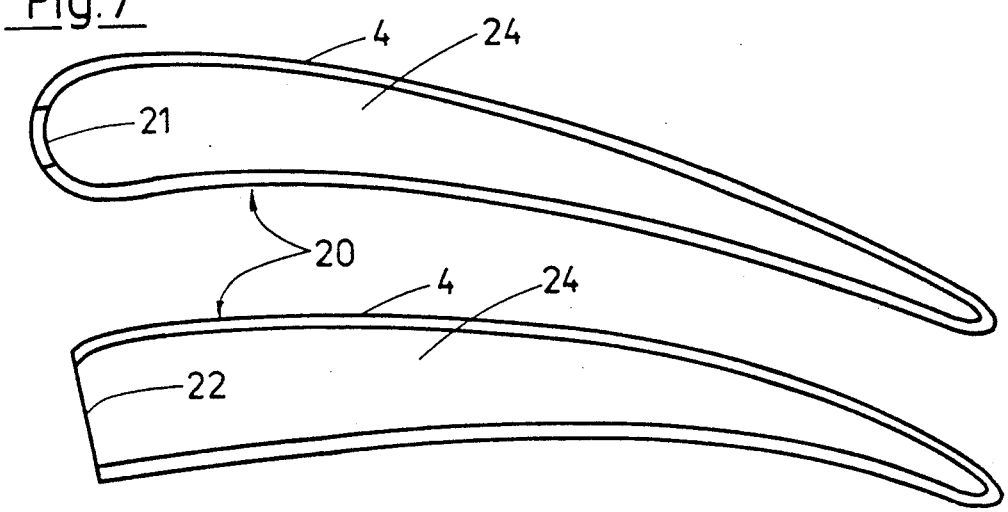
Fig. 7
Fig. 8

DEVICE FOR ACCELERATING THE OPENING AND/OR EXTENSION OF AVIATION DEVICES, SUCH AS CANOPY PARACHUTES, SQUARE OR SLIDING PARACHUTES, GLIDERS (HANG-GLIDERS) AND OTHERS

This invention relates to a device for accelerating the opening and/or extension (deployment) of aviation devices, such as canopy parachutes, square or gliding parachutes, gliders (hang-gliders) and others, the aviation device being provided depending on its configuration, in particular on its side or end facing the air mass to be entrapped with a hem or seam, said device being equipped with a plurality of shrouds or lines of cord which shrouds are guided on said hem or rim.

Most fatal accidents in aviation occur in the event of crashes from low heights or under flight conditions which call for very short opening times of the life-saving parachute and/or where the time-consuming escape from the aircraft is no longer possible. This means that, for instance, there is hardly any chance for the parachute to open in time from low heights of abt. 20–30 m so that fatal accidents cannot be avoided.

There have been disclosures of parachutes with devices for rapid opening which pull the parachute from its wrapper by means of a rocket and whose canopy and shrouds are extended in a very short period of time. A drawback of these is in the fact that the canopy will then fill only slowly as a function of the relative speed between the parachute and the air. Another drawback is the danger potential of the rocket.

It is also prior art to have a spring eject and unfold a small pilot parachute from the wrapper for the deployment of a main parachute. The aerodynamic resistance of the pilot parachute accelerates the withdrawal of the canopy and the shrouds from the wrapper. A disadvantageous feature is in the fact that the size of the pilot parachute is limited. Furthermore, the withdrawal force depends on the relative speed between the parachute and the air, this applying also to the inflation of the canopy.

Other parachutes are known whose canopies and shrouds are pulled from the wrapper and extended as described further above by means of a rocket or pilot parachute where the actual opening and inflation are accelerated by taking the shrouds through a ring arranged directly below the edge of the canopy. This ring contains an explosive charge which is detonated when the shrouds and canopy are stretched out to full length. The detonation causes the mass of the ring for each shroud to be broken up to provide one small mass for each shroud and these masses with the shrouds are thrown apart whereby the canopy can quickly fill in the air stream. A disadvantage is the danger potential of the device and its high complexity.

Other known solutions for a quicker withdrawal of a parachute from its wrapper use a flyweight that is accelerated. The fly-weight can be accelerated by means of a spring, a powder charge or compressed air. The weight is generally attached to the apex of the parachute canopy. Again it is a drawback here that inflation of the canopy is not accelerated. The weights constitute a great danger to persons and equipment.

Other known devices for rapid opening of parachutes have hoses (tubes) arranged on a radiating pattern starting from the apex of the canopy, these hoses being gathered with the fabric of the parachute. On initiating the opening of the parachute, compressed gas is admitted from a pressure vessel through a valve into the hoses which will then extend. In this case, a disadvantage is in the fact that filling of the canopy takes a relatively long time making a safe landing impossible when escaping from the aircraft at low heights and under critical flight conditions.

Another known device provides for a ring-shaped hose (tube) to be attached to the periphery of the canopy by lacing. Here again the canopy is folded up in the wrapper. On initiating the opening of the parachute, the hose is filled from a pressure cylinder via a valve. The disadvantage of this device is in the fact that the shrouds and canopy are normally withdrawn from the wrapper and extended during a relatively long period of time with the inflation of the hoses involving substantial additional time.

Another known variant of this disclosure provides for the hose to be filled at low pressure in the wrapper, the parachute being folded up according to no specific method. A drawback here is that the parachute has to be withdrawn from the wrapper in the conventional manner and reliable deployment of the canopy is not ensured either.

Where an escape has to be made from or with low-flying aviation devices or jumps are made with parachutes at low heights there is rarely a genuine chance of a safe landing. The disadvantage of conventional parachutes due to the high risk involved makes itself felt especially during the critical phases of the flight, e.g. during take-off and landing.

In the case of conventional parachutes, the procedure is usually for a pilot parachute pulling first the canopy and then the shrouds from the wrapper. Both the pulled-out canopy and the shrouds are briefly exposed to the air stream in an uncontrolled manner until the parachute unfolds, whereby the parachute is liable to drift onto and possibly entangles with the aircraft.

The object of the present invention is to further develop a device for accelerating the opening and/or extension (deployment) of aviation devices, such as canopy parachutes, square or gliding parachutes, gliders (hang-gliders) and others in a manner that the time required for the release of the parachute from the wrapper and, at the time, the time for opening the parachute can be reduced to such an extent that a safe landing can be carried out even in the case of drops from low heights, e.g. 20 m at zero initial speed, the rapid unfolding and inflation of the canopy also causing the shrouds to straighten out immediately and preventing entangling with the other shrouds or the aircraft and, furthermore, eliminating the need for time-consuming escape from a light-weight aircraft, e.g. a hang-glider, because the equipment will be saved together with the aviator.

According to the invention, this object is achieved with a device of the type initially referred to in that the device is formed as a hose (tube)-shaped air space and arranged at least along part of the circumference of the hem or seam and in that this air space is equipped with filling and isolating valves and, in the operative condition of the aviation device, is inflated with air at a high pressure.

These features not only advantageously solve the problem underlying the invention, but an additional advantage is obtained in that the safety of the person to be saved can be catered for in all phases of a developing accident. Moreover, manipulation of the device is simplified so that even persons who are inexperienced in jumping with a parachute can be saved with such a canopy parachute, a square parachute and others, whereby further accidents can be avoided.

Figure 2:
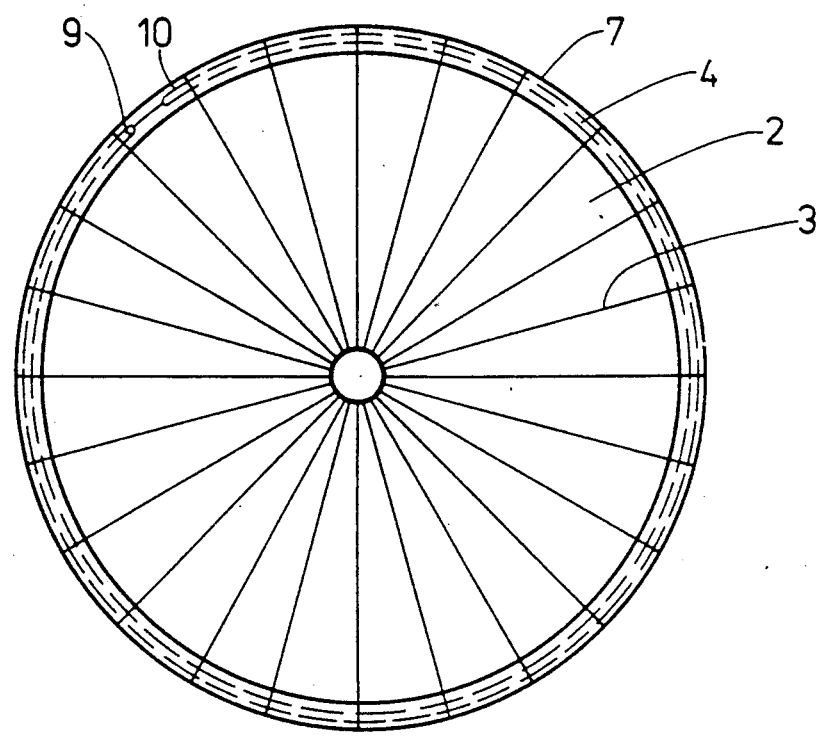
Figure 3:
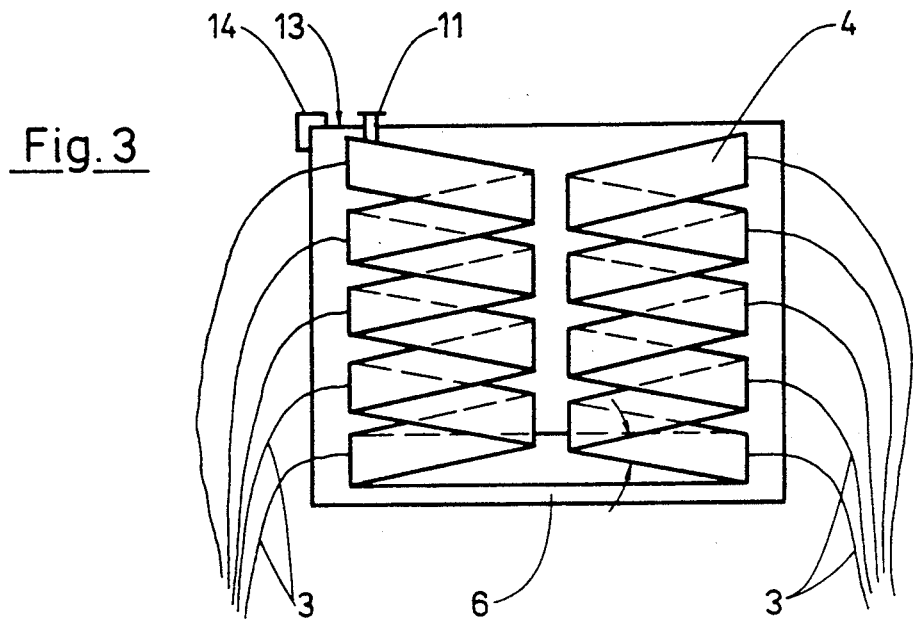
Figure 4:
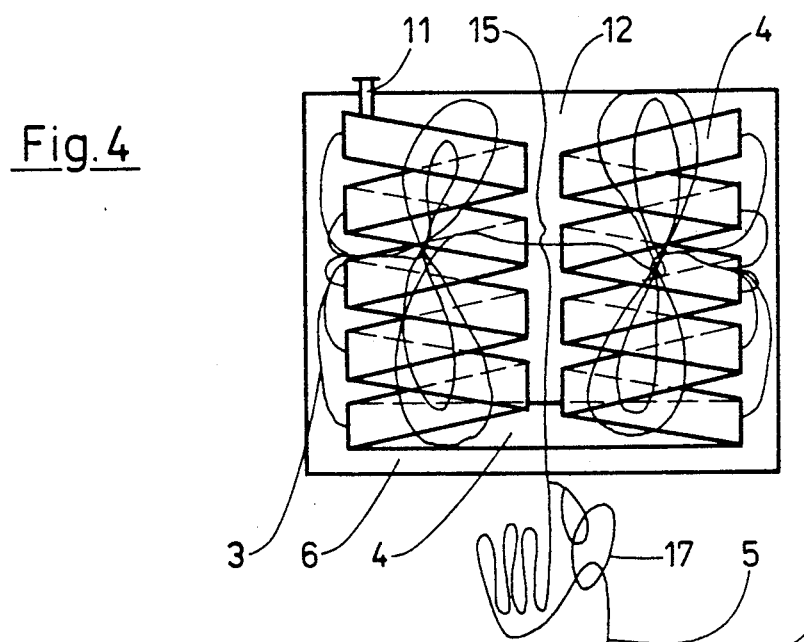
Figure 5:
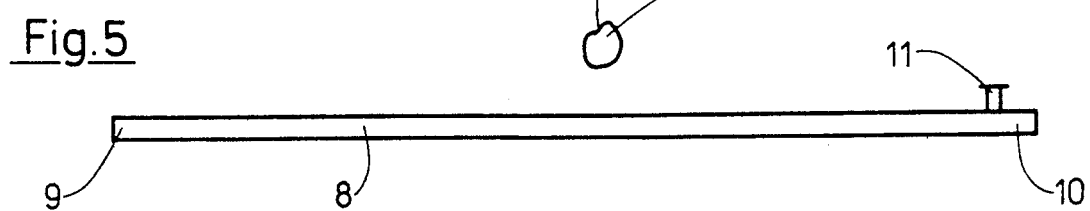

Two of the possible typical embodiments of the invention are schematically illustrated in the drawing in which:

FIG. 1 is a side view of a descending aviation device formed as a canopy parachute, FIG. 2 is a plan view of the parachute in FIG. 1, FIG. 3 is a plan view of the wrapper with the parachute packed in it, FIG. 4 is the plan view in FIG. 5 with the shrouds packed in additionally, FIG. 5 is a plan view of an extended hose (tube) before its insertion in the hem on the circumference of the parachute, FIG. 6 is a perspective view of a descending aviation device formed as a square parachute, FIG. 7 is a side view of an airfoil section of a cell of a square parachute with the inflatable hose placed in its seams, The hose extending far into the leading nose of airfoil section.

Figure 9:
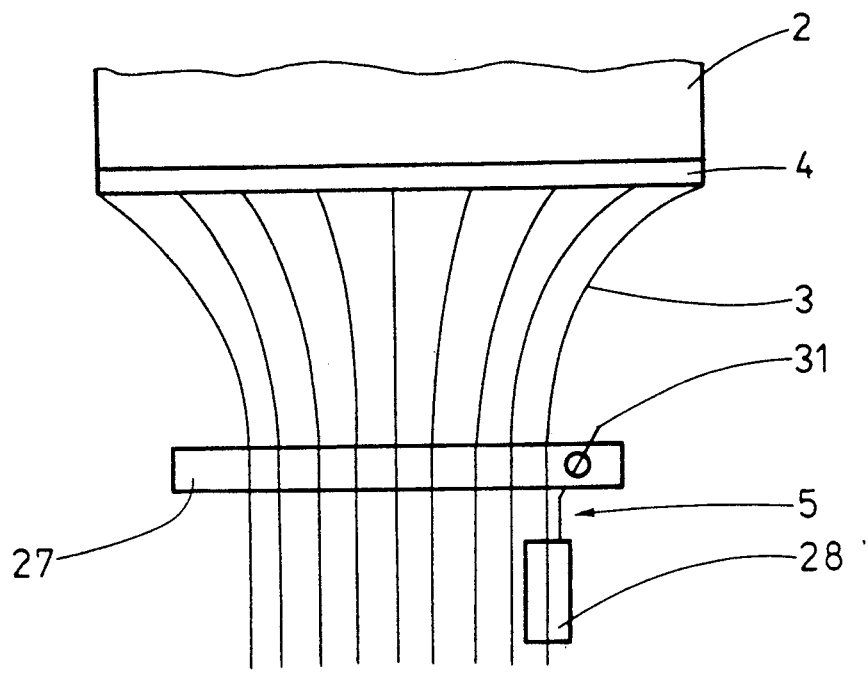
Figure 10:
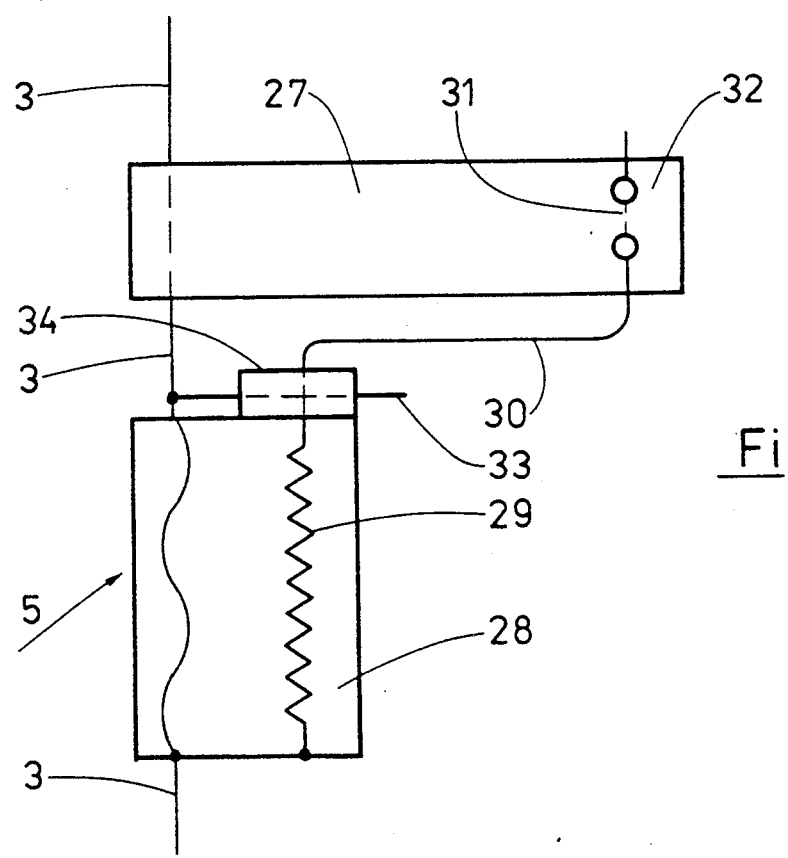

FIG. 8 is a side view of an airfoil section of a cell as in FIG. 7 where the hose does not extend as far in the leading nose of the airfoil section, FIG. 9 is a view of the opening restrictor which holds the shrouds together before the parachute is deployed, and FIG. 10 is an enlarged view of the opening restrictor according to FIG. 9.

The device 1 according to the invention is formed for a canopy type parachute essentially by a canopy 2, the shrouds 3 and an air space 4 for rapid deployment of the canopy as well as at least one opening restrictor 6 and a wrapper 6.

While the canopy 2 and the shrouds 3 as well as the ripcord correspond closely to conventional configurations in respect of size and material properties, the canopy 2 is provided in the region of its base with at least one air space 4 for rapid deployment of the canopy 2 and this air space is formed as a hose(tube)-shaped air space which extends at least over the greater part of the circumference of the canopy at its base 7.

The air space 4 may be formed either as a hose(tube)-shaped hem at the base 7 of the canopy 2 or it may be formed only as a holder for a separate hose (tube) 8 to be threaded through said hem.

Where the hem itself forms the air space 4, it will be made of a reinforced, tear-proof fabric, having a plain surface outside and a special lining applied inside to make the air space impervious to the outside. This air space 4 may extend over only part of the circumference of the base 7 or it may extend all round its circumference in which case it will form a ring which is not fully closed. The free ends 9, 10 of this air space 4 or hem will be sealed hermetically either by welding or the use of solid plugs. The air space provided in this manner will be equipped with at least one valve 11 and, in the operative condition of the parachute, will be inflated with air at a high pressure, e.g. 5–15 bar. The hem itself is permanently attached to the canopy 2 and, as a rule, will be sewed or otherwise fastened to it.

In order to prevent uncontrolled extension of the air space 4 which is inflated with air, e.g. the hose (tube), during the deployment of the canopy 2, it is recommended that the free ends 9, 10 of the hose be connected by means of a rope 18.

The hem 2, which is connected to the canopy 2 in this manner and, as already explained, is subject to the pressure of the air, tends to straighten out so that; on releasing the parachute, it will extend the canopy 2 whereby air is immediately entrapped in it, causing it to be inflated. The air space 4 or hem thus ensures that the canopy 2 is deployed after a very short period of fall in order to decelerate the rate of descent.

The air space formed as a separate hose (tube) 8 will act analogously to the air space 4 formed integrally in the hem. This hose 8 may either be threaded through a tubular hem or through a number of eyes in order to connect it to the base 7 of the canopy 2.

The hose (tube) 8 itself, which is of tear-resistant construction, will be filled same as the hem with air at a high pressure so that, on releasing the parachute, it will open instantly, i.e. try to stretch out, causing the canopy 2 to be opened which will then start to retard the rate of descent as a function of the air mass entrapped in it.

The hose (tube) 8, too, may be provided to form substantially a ring on the circumference of the base 7 of the canopy 2 or it may extend only around part of the circumference. The free ends 9, 10 of the hose 8 will be sealed air-tight same as in the case of the (integral) hem and interconnected by means of a rope 18 or fastened to the circumference of the canopy 2. A compressed-air valve 11 on the hose 8 will enable the hose to be inflated with air same as in the case of the air-tight (integral) hem.

When packing the parachute, the canopy 2 is best folded in a manner that one half each of the shrouds 3 is placed on the outside and the air space 4, e.g. the hose (tube) 8 or (integral) hem is folded meander-fashion. The air space 4, e.g. the hose 8 or the hem which is thus packed meander-fashion is packed flat with the folds side by side and not on top of each other, see FIG. 3.

According to the invention, the wrapper 6 may be formed by a flat plate 12, consisting preferably of a springy material, such as glass-fiber reinforced plastic. An angle 14 is attached at one edge 13 on the right and/or left-hand side for stiffening. The shrouds 3 are coiled in ever smaller figure-of-eight coils on the bottom of the wrapper. A strap 15 which joins the ends of the shrouds 3 and to which the object 16 to be saved is attached is placed to one side.

The hose 8 packed flat meander-fashion with the folds side by side is placed on the shrouds (3) on the bottom of the wrapper 6 in a manner that it completely covers it. The valve 11 is placed so it lies at an edge 13. On top of this is gathered the fabric of the canopy 2, the correctness of the folding procedure being of secondary importance.

To close the wrapper 6, the plate 12 is formed into a roll which encloses the parachute with the stiffening angle 14 facing outwards. The strap 15 is placed round the middle of the roll-type pack and kept closed by means of an easy and quick to open lock. The wrapper 6 is made of springy material so that, on releasing the lock, the wrapper will spring open instantly and expose the parachute. Projecting from the wrapper 6 are two loops 17 or pins by means of which the wrapper can be attached to the object 16, for instance a parachutist, hang-glider or ultra-light aircraft.

In the case of a parachutist, the roll will normally be fastened on his back parallel to his body whereas, in the case of hang-gliders and ultra-light aircraft, it will be arranged in the flight direction, for instance, on the fuselage. With a view to minimizing the aerodynamic resistance, the opening in the wrapper 6 may be closed at the front looking in the flight direction with a hemispherical bulb and, at the rear end of the roll, with a cylinder.

After the wrapper 6 has been closed, air will be admitted through the valve 11 at a high pressure (6 bar or more) into the air space 4, e.g. the hem or hose 8. The air space 4 will expand and fill up the whole pack. The wrapper 6 will be subjected to a very high additional tension. On inflating the air space 4 or hose 8, this will tend to straighten out. The meander-type folding pattern will cause the hose to exert an additional pressure to open the wrapper. After the air space 4 or hose 8 has been filled, an instrument may be connected via a hose to the valve 11 permitting a convenient check to be made at any time on the pressure in the air space 4 or hose 8.

The connecting strap 15 extending from the opening of the wrapper will be connected to the person to be saved or, additionally, to the equipment 16 to be landed safely. In the case of aircraft, such as sail planes, ultra-light aircraft or hang-gliders, the parachute pack will preferably be arranged above the wings so as to cause little resistance in flight or to make it self-supporting. In this manner, fouling with the aircraft 16 will be avoided.

The connecting strap 15 is stowed in gathers and provided with an additional quick-opening device which has to be released separately. If the parachute is released at low heights, the connecting strap 15 remains gathered and the person and/or aircraft 16 to be saved will be suspended directly on the parachute. When dropping from greater heights, it is possible on releasing the parachute to extend the connecting strap 15 by a quick-release device whereby an aircraft, in particular, will be suspended at a somewhat greater distance below the parachute which is somewhat more favourable.

In the case of very fast airplanes, it is possible initially to have the parachute unfold only partly by preventing the shrouds 3 from spreading over their full length. This will prevent too sudden and forceful a deceleration of the person, e.g. the pilot. Only when the braking force (g) becomes less than a preset spring force, will the spring contract and release an opening delaying device 18 to release the full shroud length whereby the canopy 2 can fully open.

On releasing the parachute 2, the wrapper 6 will fly open exposing the canopy 2 instantly. Due to the folding pattern of the air space 4, e.g. the hose (tube) 8 and the tendency of the hose when folded to straighten out spring-like, the fabric of the canopy 2 and the hose will be ejected from the wrapper almost simultaneously. As soon as the complete hose 8, which was stowed meander-fashion, has been ejected from the wrapper 6, it will extend spontaneously due to the very high pressure of the air in the hose to form a ring or ring-like configuration. This will also cause a large proportion of the shrouds 3 to be pulled simultaneously out of the wrapper 6 and extended. Before the air resistance can properly act on the canopy 2, the parachute will already have been opened and inflated.

Even the slightest drag on the connecting strap 15 will additionally assist the extension of the shrouds 3. Depending on the pressure in the air space 4 or hose (tube) 8, the diameter of the hose and the size of the parachute, the whole deployment of the parachute will take less than 0.5 seconds.

In addition to a conventionally used manual release device, it is possible to provide automatic release devices 18 which are activated, for instance, on failure of a wing of a glider.

The harness of a hang-glider pilot, for instance, would be attached to the connecting strap 15 and taken to the trapeze, forming one or two loops at its end. Should the hang-glider pilot have forgotten to clip onto the connecting strap 15 before take-off, he could grab the loops 17 and so release the parachute and save his life.

Analogous to the arrangement of the device 1 in the case of canopy parachutes 2, it can be applied to square parachutes, gliding parachutes and others.

In the case of square parachutes 19 which are formed by individual cells 20, the air space 4 can be incorporated in the joint seams and there the air space can be constructed so as to impart an airfoil section to the cell, see FIGS. 7 and 8. This airfoil section may, depending on the desired gliding ability of the square parachute 19, be rounded at its leading edge stream and thus be substantially closed, or it may be open. In the former case, the section would have only a small opening 21 at the leading edge to admit air while, in the latter case, it would have a larger opening 22 for the air stream to enter. It would also be possible for the individual cells 20 to communicate with each other through openings 23 in their side walls.

The air space 4 which also assists the stiffening and/or shaping of the square parachute 19 may be arranged in different places of such a parachute, for instance, in the opening region, i.e. at the ends of the cells 20 or at their sides 24, see RIG. or on the top or underside 25, 26 of the section as well as in connections of these.

In other words, the arrangement of the air spaces 4 will in many cases depend, on the one hand, on the configuration of the square parachute 19 and, on the other hand, on the desired gliding ratio.

As regards the shrouds 3 of such a square parachute 19, these may also be provided with an opening restrictor 5, but this may often be omitted because such a square parachute 19 will, as a rule, be opened beforehand and then the jump is made.

The opening restrictor 5 for the successive release of the shrouds 3 may, in principle, be constructed in different ways and only one of the possible variants will be described below.

In the case of this configuration which is shown in FIGS. 9 and 10, the shrouds 3 of, say, a canopy parachute 2, are held together by a ring-shaped collar 27 and this collar is permanently attached to one of the shrouds. Below this collar 27, there is a spacer 28, say, in the form of a rod or a tube fastened to the same shroud 3 and spring means 29 are provided in parallel with this rod or tube. The spring means 29, which may take the form of a spiral spring or rubber band, are attached with their one end to the spacer 28 and, with their other end, via a loop 30 to a pin 31 which is taken through holes 32 at the free ends of the collar 27. A locking pin 33 is provided on the same shroud 3 to prevent the contraction of the spring means 29 prior to the release of the shrouds 3 by the collar 27. If then the locking pin 33 is pulled from its lock 34 due to the shroud 3 being extended, the spring means 29 will be unlocked simultaneously whereupon the spring mean 29 will contract immediately, causing the pin 31 to be pulled out of the holes 32 of the collar 27 in the process. As this pin 31 is pulled from the holes 32 in the collar 27, the shrouds 3 are released to spread radially so that the canopy parachute or, respectively, its canopy 2 can unfold. Accordingly, the release of the shrouds 3 will occur at a time when the rate of descent has been somewhat retarded so that a smaller g-load will act on the person or load 16 than would be the case if the canopy 2 were opened at once. The spring means 29, which preferably would be take the form of a rubber band, may, where a tube is used as the spacer 28, be preferably be arranged inside the tube.

Other variants of such an opening restrictor 18 could take the form of a weight attached to the shrouds 3 which, in the locking position of the pin 31, would be held in equilibrium by similar spring means 29 and would release the pin as the g-load increases by an analogous increase in weight. At 1 g load, such a weight would, for instance, be 80 kg and, at 4 g load, reach the weight of 320 kg, etc. Opening restrictors 18 such as described above could be provided on several of the shrouds 3 so that the shrouds would be released successively as a function of the rate of descent.

Analogous to this opening restrictor 18, a ring could be placed around all shrouds 3 and attached to a centre shroud to be moved up and down by the parachutist himself. Depending on the relative height of this ring, the shrouds 3 would be released to spread more or less in the radial directions so that the rate of descent could be varied. This possibility calls for a certain amount of practice on the part of the jumper.

Similarly, it would be possible in order to limit the g-load in the case of an aviation device 19, e.g. a canopy parachute 2 which is equipped with a so-called centre shroud, to use this centre shroud itself to limit the g-load. In such a case, the centre shroud would be gathered and shortened, for instance, by a panic hook, similar to the collar 27 and an opening delay device 5 (see FIG. 10) would be provided to release the panic hook when a sufficiently low g-load exists. Thanks to this feature, the substantially inverted centre of the canopy 2 under conditions of free fall would be released to permit full inflation of the canopy only when the opening delay device 5 has been activated by release of the panic hook 27.

It is axiomatic that this method of limiting the g-load could be effected in steps by providing several opening delay devices 5 in series, or the limiting device could release the centre shroud steplessly by means of a brake.

Such a brake could be constructed with a weight which provides a greater or smaller down-pull depending on the g-load and a pressure arm hinged to it to provide friction-grip action on a centre shroud formed as a strap. The use of a strap for the centre shroud offers an advantage in that it is easier to distinguish from the other shrouds 3. Another advantage of the strap is that, on landing on the ground and under conditions of high winds at ground level, it can be more easily pulled on which helps to collapse the canopy 2 quickly and prevents the parachutist from being dragged along on the ground.

We claim:

1. Device for accelerating the operation of aviation apparatus, constructed as a gliding parachute formed by a plurality of air chambers connected at their sides, these air chambers being typically open at their one end and closed at their other end, the aviation apparatus being provided, with a plurality of shrouds for carrying a load, said shrouds being attached to said aviation apparatus, characterized in that the device (1) is formed as a hose (tube)-shaped air space (4) and in that this air space is equipped with filling and isolating valves (11) and, in the operative condition of the aviation apparatus is filled with air at high pressure; wherein the air chambers (20) are formed with the air spaces (4) at least in their top sections;
wherein the hose-shaped (tubular) air space (4) forms an airfoil section extending over the full length of the particular air chamber (20) and in that this airfoil section is provided on both sides of an air chamber.

2. Device as in claim 1, characterized in that, in addition to the top side sections (25), further air spaces (4) are provided in the bottom sections (26).

3. Device as in claim 1, characterized in that the air space (4) is formed by a fabric hose (tube) and a plastic or rubber hose placed in it in a manner to prevent displacement.

4. Device as in claim 1, characterized in that at least one opening restrictor (5) is provided between the load (16) and the aviation apparatus (canopy 2, square parachute 19) for the shrouds (3) and in that this opening restrictor permits the radial spreading of the shrouds only when a present g-load (decceleration force) is reached.

5. Device as in claim 4, characterized in that the opening restrictor (5) is formed by a ring-shaped collar (27) attached to one shroud (3) and embracing the other shrouds as well as a pin (31) capable of being withdrawn from holes (32) in the collar.

6. Device as in claim 1, characterized in that the air space (4) is provided with a valve (11) for filling it at least at one of its ends.

7. Device as in claim 6, characterized in that the valve (11) is formed with a thread at its end opposite to its filling opening for two pressure plates clamping the end of the air space (4) to provide an air-tight seal and a nut clamping these plates.

8. Device as in claim 1, characterized in that at least the canopy (2), the air space (4) and the shrouds (3) of the parachute are capable of being placed in a wrapper (6) in a manner that the air space, is folded meander-fashion and fills the bottom area (12) of the wrapper and in that the straightening forces of all folds of the air space act in the direction to open the wrapper.

9. Device as in claim 8, characterized in that the wrapper (6) is equipped with a plate (12) made of springy material and in that this wrapper 6 is so closed that it forms a roll in the closed condition which is kept closed by at least one lock, wherein this lock is formed by a strap (15) and is disposed at the middle of the wrapper 6.

10. Device for accelerating the operation of aviation apparatus, the aviation apparatus being provided, with a hem, in particular, at its side or end facing the air mass to be entrapped, and equipped with a plurality of shrouds for carrying a load, said shrouds being attached and guided on said hem, characterized in that the device (1) is formed as a hose (tube)-shaped air spaced (4) and provided along at least part of the circumference of the hem and in that this air space is equipped with filling and isolating valves (11) and, in the operative condition of the aviation is filled with air at high pressure; wherein at least one opening restrictor (5) is provided between the load (16) and the aviation (canopy 2, square parachute 19) for the shrouds (3) and in that this opening restrictor permits the radial spreading of the shrouds only when a present g-load (decceleration force) is reached; wherein the opening restrictor (5) is formed by a ring-shaped collar (27) attached to ohe shroud (3) and embracing the other shrouds as well as a pin (31) capable of being withdrawn from holes (32) in the collar; wherein the opening restrictor (5) is formed by a spacer (28) provided on one shroud (3) as well as spring means (29 rubber band, spiral spring) arranged parallel to the latter as well as a locking pin (33) releasing (on withdrawal) the spring tension and in that this locking pin (33) is fastened to the same shroud (3) as the spacer (28) and is released from its lock as this shroud is extended.

11. Device as in claim 10 for an aviation apparatus characterized in that the hem is provided in the region of the base of the canopy (2) and in that this hem integrally forms the hose (tube)-shaped air space (4) of the device (1).

12. Device as is claim 10, characterized in that the hem is formed in the shape of a hose (tube) and contains within an inflatable tube (8), and wherein the hem is formed with a tear-resistant fabric on the outside and an air-impervious lining inside.

13. Device as in claim 10, characterized in that the hem is formed a tear-resistant fabric on the outside and an air-impervious lining inside.

14. Device as in claim 1, characterized in that the air space 4 forms a substantially closed ring and extends over the greater part of the circumference of the hem and is capable of being sealed air-tight at its ends.

15. Device as in claim 1, characterized in that the air space (4) is formed by the hem and a plastic or rubber hose (tube) inserted in it.

16. Device as in claim 10, characterized in that the air space (4) is formed by webbing formed as a tube and in that this webbing contains air-tight hose (tube) and forms the hem.

17. Device as in claim 10, characterized in that the spacer (28) is a tube and in that the shroud (3) is threaded through this tube and fastened at least to one end of the tube and in that the spring means (29) are also taken through this tube and fastened with their one end to the tube and with their other end to the locking pin (33).

18. Device as in claim 10, characterized in that the air space (4) is formed by a fabric hose (tube) and a plastic or rubber hose placed in it in a manner to prevent displacement and in that these hoses (tubes) are provided at the hem.

* * * * *